(12) United States Patent
Pirk et al.

(10) Patent No.: US 8,581,470 B2
(45) Date of Patent: Nov. 12, 2013

(54) ELECTRODE COMB, MICROMECHANICAL COMPONENT, AND METHOD FOR PRODUCING AN ELECTRODE COMB OR A MICROMECHANICAL COMPONENT

(75) Inventors: Tjalf Pirk, Stuttgart (DE); Stefan Pinter, Reutlingen (DE); Joerg Muchow, Reutlingen (DE); Joachim Fritz, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 12/736,461

(22) PCT Filed: Dec. 4, 2008

(86) PCT No.: PCT/EP2008/066811
§ 371 (c)(1),
(2), (4) Date: Dec. 16, 2010

(87) PCT Pub. No.: WO2009/124611
PCT Pub. Date: Oct. 15, 2009

(65) Prior Publication Data
US 2011/0101821 A1    May 5, 2011

(30) Foreign Application Priority Data
Apr. 8, 2008  (DE) .................. 10 2008 001 053

(51) Int. Cl.
*H02N 1/00* (2006.01)

(52) U.S. Cl.
USPC ........................................................ 310/309

(58) Field of Classification Search
USPC .......................................... 310/309; 359/225.1
See application file for complete search history.

(56) References Cited

U.S. PATENT DOCUMENTS

| 7,085,122 | B2 * | 8/2006 | Wu et al. .................. 361/277 |
| 8,082,651 | B2 * | 12/2011 | Zaitsu et al. ................ 29/513 |
| 2005/0013087 | A1 | 1/2005 | Wu et al. |
| 2005/0194650 | A1 | 9/2005 | Hung |
| 2007/0216986 | A1 | 9/2007 | Huber et al. |
| 2008/0239429 | A1 * | 10/2008 | Sandner ..................... 359/196 |
| 2008/0242049 | A1 * | 10/2008 | Jung et al. ................... 438/457 |

FOREIGN PATENT DOCUMENTS

| JP | 2004 219839 | 8/2004 |
| WO | WO 2005/011071 | 2/2005 |

* cited by examiner

*Primary Examiner* — Burton Mullins
(74) *Attorney, Agent, or Firm* — Kenyon & Kenyon LLP

(57) ABSTRACT

An electrode comb for a micromechanical component includes at least one electrode finger for which a first electrode finger subunit with a first central longitudinal axis and a second electrode finger subunit with a second central longitudinal axis are defined. The second central longitudinal axis are defined is inclined in relation to the first central longitudinal axis about a bend angle not equal to 0° and not equal to 180°.

8 Claims, 4 Drawing Sheets

ELECTRODE COMB, MICROMECHANICAL COMPONENT, AND METHOD FOR PRODUCING AN ELECTRODE COMB OR A MICROMECHANICAL COMPONENT

BACKGROUND OF THE INVENTION

1. Field of the Invention

The present invention relates to an electrode comb for a micromechanical component, and to a manufacturing method for an electrode comb.

2. Description of Related Art

A micromirror having an electrostatic drive is often used for deflecting optical beams, e.g., in barcode scanners and in projection systems, or for switching optical data links. For adjusting the micromirror, the micromirror may be induced to vibrate at its natural frequency. This is known as the resonant mode of the micromirror. An electrostatic drive having two electrode structures situated in a plane is used for the resonant mode in most cases.

The resonant mode of the micromirror allows great deflections of the micromirror for a comparatively low energy input, although only via a sinusoidal vibration at a frequency equal to the natural frequency of the micromirror. A reflected beam of the micromirror oscillating at its natural frequency scans the center of an image very rapidly and scans an edge of the image comparatively slowly, possibly resulting in problems in signal analysis. In addition, an adjustment of a micromirror in two spatial directions is difficult to accomplish via the resonant mode, in particular to allow projection in lines, and is associated with poor image resolution. An image constructed via the resonant mode often makes an out-of-focus impression on an observer based on the Lissajous figure in particular.

To circumvent these problems, a micromirror adjustable in at least one direction via a quasistatic mode is often used in line-by-line projection of video images. The electronic drive here often has two electrode combs situated one above the other and offset in parallel to one another, so-called OOP (out-of-plane) electrode combs. As an alternative to the OOP electrode combs, the electrostatic drive may also have electrode combs positioned at an inclination to one another, frequently referred to as AVC (angular vertical combs). When two AVC electrode combs are used, the stator electrode comb is rotated out of its mounting plane, so that even without a voltage applied between the electrode combs, the electrode fingers of the stator electrode comb protrude into the electrode interspaces of the actuator electrode comb. The placement of the two electrode combs at an inclination to one another is implemented, for example, via a mechanical influence, preferably at the time of packaging the two electrode combs, or by a shaping step.

BRIEF SUMMARY OF THE INVENTION

The present invention makes possible a micromechanical component, which combines the special advantages of two parallel offset electrode combs (OOP electrode combs) and two electrode combs positioned at an inclination to one another (AVC electrode combs).

In a refinement of the electrode comb, it has more than two subunits having different angles of inclination. In this case, at least one third electrode finger subunit of at least one electrode finger having a third central longitudinal axis is definable, the electrode finger subunit being inclined by a bend angle not equal to 0° C. and not equal to 180° C. with respect to the first central longitudinal axis and with respect to the second central longitudinal axis. This improves the advantages of the electrode comb in cooperation with another electrode comb in comparison with an OOP electrode comb or an AVC electrode comb. This advantage is also obtained when two electrode combs according to the present invention cooperate.

The micromechanical component according to the present invention may include in addition at least one third actuator electrode comb and at least one third stator electrode comb, a voltage optionally being applied between each additional actuator electrode comb and an associated additional stator electrode comb. The two electrode combs between which a voltage is optionally applied may be inclined to one another at least one third angle without an applied voltage, the third angle of inclination possibly not being equal to the first angle of inclination and not being equal to the second angle of inclination.

In an example embodiment, the micromechanical component includes an actuator which is adjustable by adjusting the first actuator electrode comb with respect to the first stator electrode comb and/or by adjusting the second actuator electrode comb with respect to the second stator electrode comb. It is thus possible to superimpose the individual torques of the first and second electrode comb pairs to obtain a total torque. This is advantageous for an adjustment angle, in which the two individual torques themselves are not constant over the adjustment angle but may be added up to form an almost constant total torque. It is likewise possible to trigger the two electrode comb pairs separately from one another. If the adjusting torque is adjusted by an adjustment angle in which the first or second electrode comb pair has a constant individual torque, then only this electrode comb pair is triggered in a targeted manner. The joint triggering and separate triggering of the two electrode comb pairs are easily executable over the entire range of possible adjustment angles.

The actuator is a micromirror plate or a micropincette, for example. The micromechanical component has many possible applications.

The actuator is preferably adjustable in a quasistatic operation. The deflection angle set for the actuator is in this case proportional to the square of the applied voltage within a limited adjustment angle range. Nonlinearities outside of this range may be compensated by combined triggering of the two comb electrode pairs.

In an example embodiment, the first actuator electrode comb is offset in parallel with the first stator electrode comb in its starting position. The first electrode comb pair is thus optimized for small angles of inclination. In this case, the first actuator electrode comb and the first stator electrode comb are preferably used for adjusting small deflection angles without having to use the electrode combs situated at an angle to one another. Thus, the electrode comb pair including the second stator electrode comb and the second actuator electrode comb is designed specifically for a high torque at large adjustment angles. The second actuator electrode comb and the second stator electrode comb are then used in particular to set large deflection angles without using the first actuator electrode comb and the first stator electrode comb.

The various actuator electrode combs and stator electrode combs are placed side-by-side along the axis of rotation of the actuator or nested radially about an axis of rotation of the actuator.

The advantages described in the preceding paragraphs are also ensured by using a corresponding manufacturing method. Due to the different placement of the various stator electrode combs and actuator electrode combs with respect to one another, the comb structures of the electrode combs may be manufactured from a thinner layer than is possible with an electrostatic drive of electrode combs offset only in parallel. This allows finer gaps and consequently allows a reduction in the number of electrodes.

A micromechanical component having at least two OOP electrode combs has the advantage that the first distance and the second distance may be selected in such a way that an advantageous torque curve is ensured for a larger range of an adjustment angle of an adjustable actuator. For example, an almost constant torque may be achieved over a wide adjustment angle range by targeted triggering of the first OOP electrode combs and/or the second OOP electrode combs.

The stator electrode combs and the actuator electrode combs may be manufactured from simple standard substrates using a standard method because of the thin useful layer. The use of expensive special wafers, e.g., SOI, may be dispensed with.

DETAILED DESCRIPTION OF THE INVENTION

The example embodiments of the micromechanical component and the electrode comb described in the following paragraphs may be used, for example, in a head-up display in the automotive field, in a miniprojector in the consumer field, in a surface scanner, or as a switch mirror in optical networks.

Figure 1A:
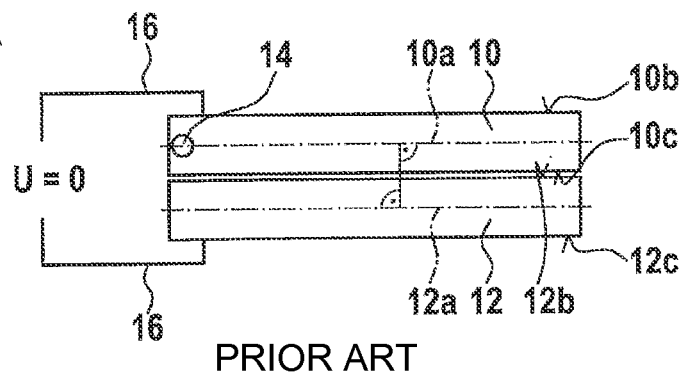
FIGS. 1A and 1B show two schematic diagrams to illustrate a functioning of two conventional OOP electrode combs.
Figure 1B:
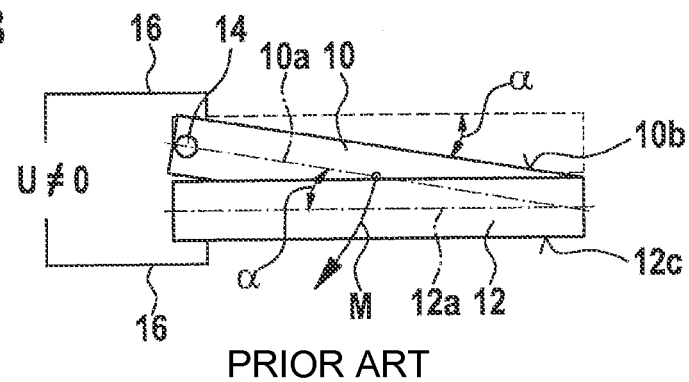

FIGS. 1A and 1B show two schematic diagrams to illustrate a functioning of two conventional OOP electrode combs.

The two electrode combs 10 and 12 shown here are embodied as actuator electrode comb 10 and as stator electrode comb 12. Stator electrode comb 12 is fixedly mounted in a housing (not shown). In contrast, actuator electrode comb 10 is situated in the housing, so it is able to rotate about an axis of rotation 14. Using a control device (not shown) and contact elements 16, a voltage U may be applied between the two electrode combs 10 and 12.

In FIG. 1A, no voltage U is applied between the two electrode combs 10 and 12. Actuator electrode comb 10 is therefore in its starting position in FIG. 1A. In its starting position, actuator electrode comb 10 is situated parallel and offset to stator electrode comb 12. The two electrode combs 10 and 12 may therefore be referred to as out-of-plane electrode combs (OOP electrode combs) or as an OOP drive comb pair. The angle of inclination of the two electrode combs 10 and 12 to one another is 0° or 180°.

A central longitudinal axis 10a of actuator electrode comb 10 situated in its starting position runs offset in parallel to central longitudinal axis 12a of stator electrode comb 12. Top side 10b and bottom side 10c of actuator electrode comb 10 are aligned parallel to top side 12b and bottom side 12c of stator electrode comb 12. In their starting positions, the electrode fingers of actuator electrode comb 10 are outside of the electrode finger interspaces of stator electrode comb 12. Both electrode combs 10 and 12 are preferably a constant distance from one another over their entire extent.

In FIG. 1B, a voltage U not equal to zero is applied between the two electrode combs 10 and 12. Because of applied voltage U, a torque M acts on actuator electrode comb 10 in the direction of stator electrode comb 12. Actuator electrode comb 10 is rotated out of its starting position shown in FIG. 1A by an adjustment angle $\alpha$.

Top side 10b of actuator electrode comb 10 is inclined with respect to its starting position (shown with dashed lines) by adjustment angle $\alpha$ in FIG. 1B. Longitudinal axes 10a and 12a of electrode combs 10 and 12 are inclined by adjustment angle $\alpha$ to one another. The electrode fingers of actuator electrode comb 10 protrude into the electrode finger interspaces of stator electrode comb 12 at the adjustment angle $\alpha$ shown here. The surfaces of the electrode fingers of actuator electrode comb 10 protruding into the electrode finger interspaces of stator electrode comb 12 are often referred to as overlap areas.

In the case of small adjustment angles $\alpha$, the value of the overlap areas increases with an increase in adjustment angle $\alpha$. The value of the overlap areas increases almost in proportion to adjustment angle $\alpha$ until reaching a limit angle $\alpha 0$. The torque acting on actuator electrode comb 10 is thus almost constant.

If adjustment angle $\alpha$ is equal to limit angle $\alpha 0$, then the electrode fingers of actuator electrode comb 10 are completely immersed at their outer ends in the electrode finger interspaces of stator electrode comb 12. If adjustment angle $\alpha$ is greater than limit angle $\alpha 0$, then the outer ends of the electrode fingers of actuator electrode comb 10 protrude out of the electrode finger interspaces of stator electrode comb 12. The increase in overlap areas therefore declines with an increase in adjustment angle $\alpha$ beyond limit angle $\alpha 0$. This is associated with a reduction in the torque acting on actuator electrode comb 10.

Figure 2:
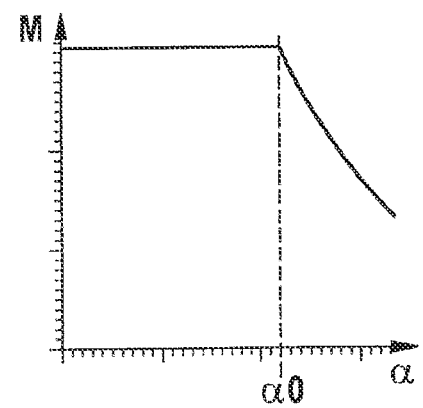
FIG. 2 shows a coordinate system for illustrating a relationship between an adjustment angle and a torque in the case of OOP electrode combs according to FIGS. 1A and 1B.

FIG. 2 shows a coordinate system to illustrate a relationship between an adjustment angle and a torque in the case of the OOP electrode combs according to FIGS. 1A and 1B. The abscissa of the coordinate system corresponds to a value range for adjustment angle $\alpha$ already described above. The ordinate of the coordinate system indicates a particular torque M acting on the actuator electrode comb.

At an adjustment angle $\alpha$ between 0° and limit angle $\alpha 0$, torque M constantly has a comparatively high value. The curve of torque M is thus stable within the value range of adjustment angle $\alpha$ between 0° and limit angle $\alpha 0$. However, torque M exerted on the actuator electrode comb declines significantly beyond limit angle $\alpha 0$.

Limit angle $\alpha 0$ is defined by a length and a height of two electrodes 10 and 12. If the two electrode combs 10 and 12 have a comparatively great height, then limit angle $\alpha 0$ may be increased. However, electrode combs 10 and 12 having a great height are more difficult to manufacture than are electrode combs 10 and 12 having a smaller height, in particular by a manufacturing method using a trench process.

Designing electrode combs 10 and 12 with long electrode fingers increases torque M at an adjustment angle $\alpha$ between 0° and limit angle $\alpha 0$. However, electrode combs 10 and 12 having long electrode fingers have a comparatively small limit angle $\alpha 0$.

In summary, it may thus be concluded that OOP electrode combs 10 and 12 are suitable only for adjustment of an adjustment element by a comparatively small adjustment angle α. If adjustment angle α exceeds limit angle α0, then the movement of the actuator is definitely slowed or brought to a standstill.

Figure 3A:
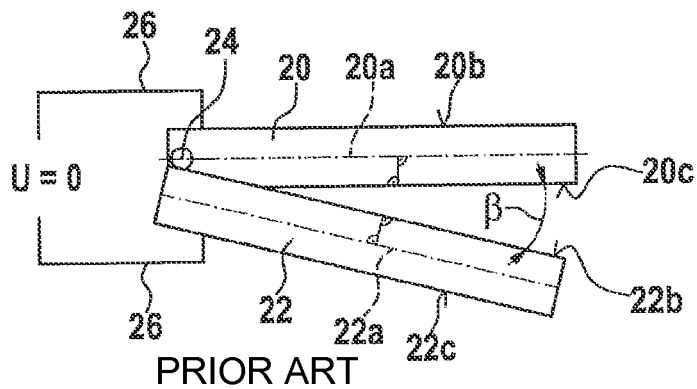
FIGS. 3A and 3B show two schematic diagrams to illustrate a functioning of two conventional AVC electrode combs.
Figure 3B:
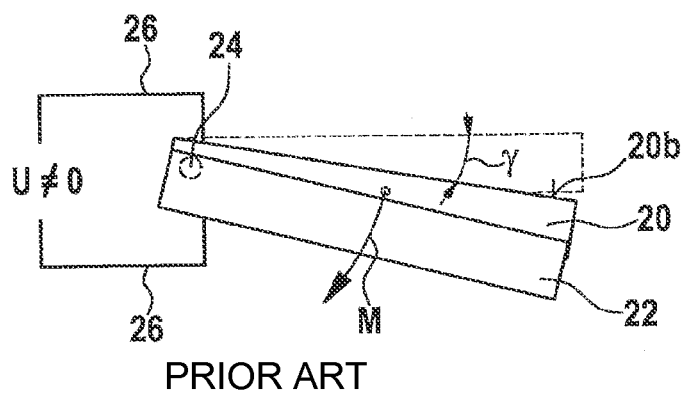

FIGS. 3A and 3B show two schematic diagrams to illustrate a functioning of two conventional AVC electrode combs.

An actuator electrode comb 20 and a stator electrode comb 22 are shown. Although the electrode comb 22 is fixedly secured, actuator electrode 20 is able to rotate about an axis of rotation 24 in the direction of stator electrode comb 22, with a voltage U applied via contact elements 26 between electrode combs 20 and 22.

In FIG. 3A, no voltage is applied between the two electrode combs 20 and 22. Actuator electrode comb 20 is thus in its starting position, in which it is aligned and inclined by an angle of inclination β with respect to stator electrode comb 22. Central longitudinal axes 20a and 22a of the electrode fingers of the electrode combs 20 and 22 enclose angle of inclination β. Top side 20b and bottom side 20c of actuator electrode comb 20 are also aligned and inclined by the angle of inclination β with respect to top side 22b and bottom side 22c of stator electrode comb 22. The two electrode combs 20 and 22 may therefore be referred to as AVC electrode combs 20 and 22 (angular vertical combs).

Even in the case of an applied voltage U equal to zero, the electrode fingers of actuator electrode comb 20 protrude into the electrode finger interspaces of stator electrode comb 22 at their internal ends. However, the increase in the overlap areas defined above is relatively low in the case of a change in the adjustment angle out of this position.

FIG. 3B shows the electrode combs of FIG. 3A after applying a voltage U not equal to zero between electrode combs 20 and 22. Because of applied voltage U, actuator electrode comb 20 experiences a torque M in the direction of stator electrode comb 22. Electrode comb 20 is thus adjusted by an adjustment angle γ with respect to its starting position shown in FIG. 3A. By rotation of actuator electrode comb 20 about axis of rotation 24 in the direction of torque M, the amount of the overlap areas is increased. However, the increase in overlap areas has comparatively small values up to a limit angle γ0.

Figure 4:
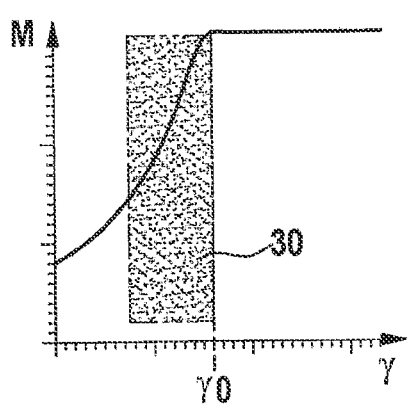
FIG. 4 shows a coordinate system for illustrating a relationship between an adjustment angle and a torque in the case of the AVC electrode combs according to FIGS. 3A and 3B.

FIG. 4 shows a coordinate system to illustrate a relationship between an adjustment angle and a torque in the case of the AVC electrode combs of FIGS. 3A and 3B. The abscissa of the coordinate system represents a value range of adjustment angle γ. The ordinate of the coordinate system represents a torque M acting on the actuator electrode comb.

In the case of an adjustment angle γ between 0° and limit angle γ0, torque M is comparatively small but increases with an increase in adjustment angle γ. This increase in torque M persists until reaching an overlap between the two electrode combs along the entire length of the electrode fingers. Beyond limit angle γ0, a constant torque M is maintained when adjustment angle γ increases. Torque M for an adjustment angle γ between limit angle γ0 and a maximum possible adjustment angle γ has a comparatively large value. Below limit angle γ0 there is an unstable range 30 in which torque M increases drastically with an increase in adjustment angle γ.

The disadvantages of two AVC electrode combs may be elucidated on the basis of the coordinate system of FIG. 4. For an adjustment angle γ within unstable range 30, a pull-in behavior of actuator electrode comb often occurs due to the high gradient in torque M. The position of the actuator electrode comb at an adjustment angle γ within unstable range 30 is thus unstable and is hardly triggerable quasistatically.

The width of unstable range 30 increases with an increase in the electrode fingers of the electrode combs. However, only comparatively long electrode fingers of the electrode combs ensure an adequate maximum torque M beyond limit angle γ0.

In comparison with the OOP electrode combs, AVC electrode combs have the advantage that torque M has a sufficiently high value at larger adjustment angles γ between limit angle γ0 and a maximum possible adjustment angle γ. AVC electrode combs are thus suitable in particular for adjusting an actuator by a large adjustment angle γ.

Figure 5A:
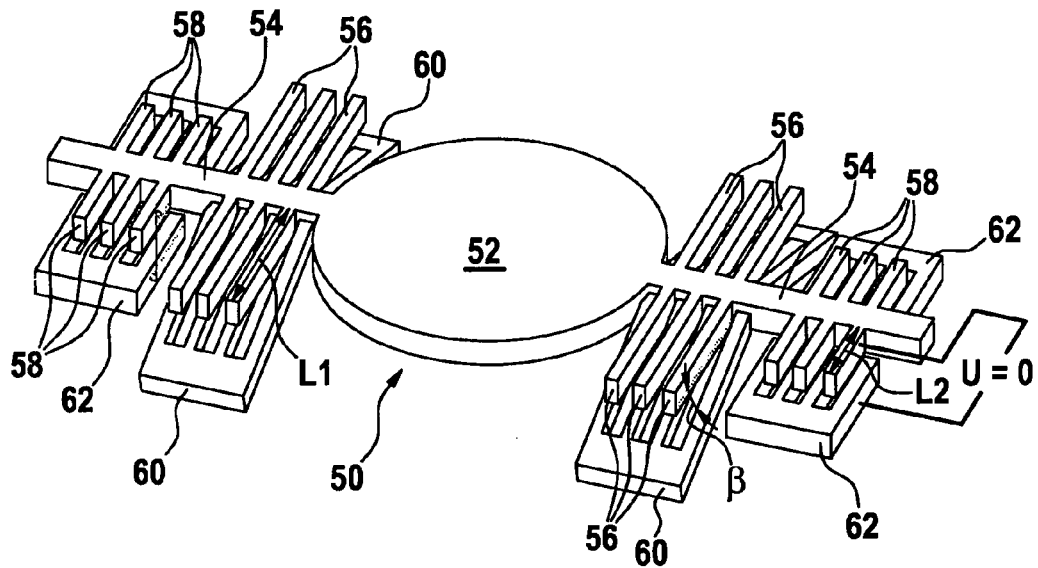
FIGS. 5A and 5B show a schematic diagram of one example embodiment of the micromechanical components.
Figure 5B:
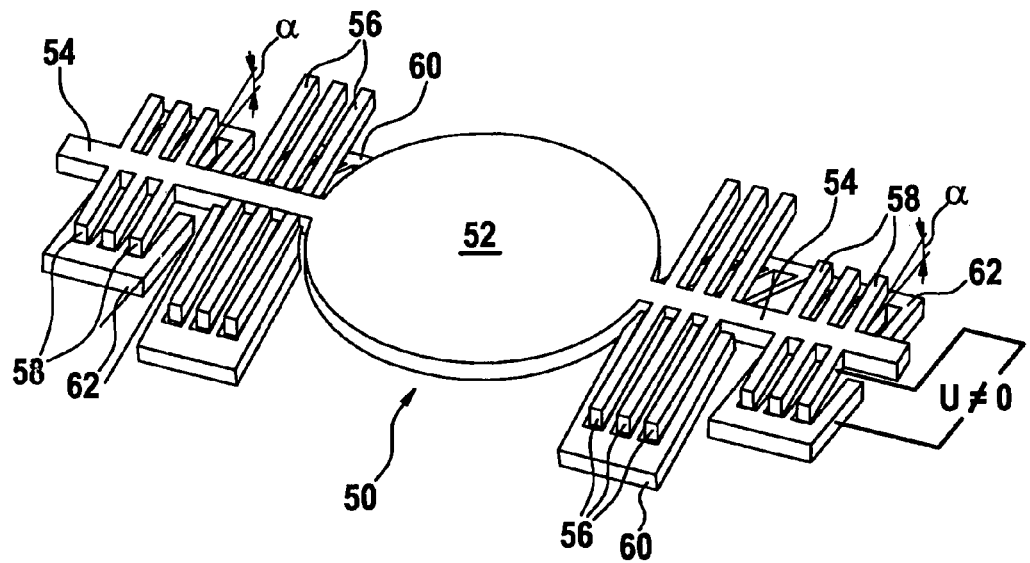

FIGS. 5A and 5B show a schematic diagram of a first example embodiment of the micromechanical component.

The example embodiment shown here has an adjusting component 50 formed from a conductive material. Adjusting component 50 includes a mirror plate 52, two web elements 54 protruding away from mirror plate 52 in opposite directions and eight electrode combs 56 and 58 protruding laterally away from web elements 54. The electrode fingers of electrode combs 56 and 58 run parallel to one another in a direction perpendicular to the longitudinal directions of two web elements 54. Each web element 54 has two electrode combs 56 and 58 on each side. Electrode combs 56 and 58 are made of the material of adjusting component 50, so that they lie in a plane with mirror plate 52 and web elements 54. Adjusting component 50 is etched out of a conductive layer, for example.

Mirror plate 52 is suspended via web elements 54 either directly or by cardan suspension. Four electrode combs 56 are situated on the sides of web elements 54 facing mirror plate 52. Three electrode fingers of electrode combs 56 have a length L1. Four electrode combs 58 likewise equipped with three electrode fingers are mounted on the sides of web element 54 facing away from mirror plate 52. Length L2 of the electrode fingers of electrode combs 58 is much less than length L1 of the electrode fingers of electrode combs 56.

The present example embodiment is of course not limited to a certain number of electrode fingers for electrode combs 56 and 58. Likewise instead of mirror plate 52, another actuator, e.g., an active element of a micropincette, may be formed on adjusting component 50.

One stator electrode comb 60 or 62 is allocated to each electrode comb 56 and 58. Each of four stator electrode combs 60 is allocated to one electrode comb 56. Correspondingly, one of four stator electrode combs 62 is mounted on each electrode comb 58.

A voltage U may be applied between at least one of electrode combs 56 and 58 of adjusting component 50 and at least one of stator electrode combs 60 and/or 62 via contact elements (not shown) and a control device. The control device is designed in such a way that at least the triggering of each stator electrode comb 60 or 62 may take place separately from that of other stator electrode combs 60 and 62.

In FIG. 5A no voltage U is applied between one of electrode combs 56 and 58 of adjusting component 50 and one of stator electrode combs 60 or 62. Adjusting component 50 is therefore in its starting position.

In the starting position of adjusting component 50, each stator electrode comb 60 is attached to a particular electrode comb 56 in an inclined position. Angle of inclination β, which is definable via the central longitudinal axes of the electrode fingers (or the top sides) of electrode combs 56 and 60 is not equal to 0° or 180°. Both electrode combs 56 and 60 may thus be referred to as AVC electrode combs.

On the other hand, each stator electrode comb 62 is attached to its particular electrode comb 58 offset in parallel. The angle of inclination between two cooperating electrode combs 58 and 62 is thus 0° or 180°. The central longitudinal axes of the electrode fingers of electrode combs 58 and 62 run parallel to and at a distance from one another. The two electrode combs 58 and 62 situated side by side may therefore be referred to as OOP electrode combs.

FIG. 5B shows the micromechanical component after a voltage U not equal to zero is applied between at least one of electrode combs 56 and 58 of adjusting component 50 and at least one stator electrode comb 60 and 62. Because of applied voltage U, adjusting component 50 is rotated by an adjustment angle α about an axis along the central longitudinal axes of both web elements 54. In this way the micromirrors 52 may be brought into a desired position.

The example embodiment described here may of course be modified by placing AVC electrodes 58 and 62 on the ends of web elements 54 facing away from mirror plate 52, and OOP electrode combs 56 and 60 may be provided on the ends of web elements 54 next to mirror plate 52. Likewise, instead of OOP electrode combs 56 and 60, additional AVC electrode combs having different angles of inclination to one another may also be provided. In addition, the lengths of the electrode fingers and/or the positions of the axes of rotation on the actuator electrode combs 56 and 68 may also be varied.

An example embodiment of the micromechanical component explained with reference to FIGS. 5A and B is of course also possible, having at least two OOP electrode combs, the central longitudinal axes of two electrode combs between which a voltage may be applied having at least two different spacings without an applied voltage.

Figure 6:
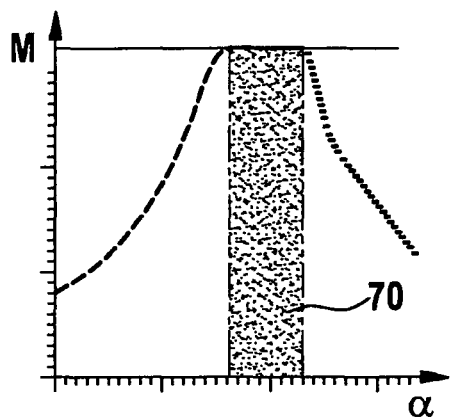
FIG. 6 shows a coordinate system to illustrate a relationship between an adjustment angle and a total torque in the example embodiment according to FIGS. 5A and 5B.

FIG. 6 shows a coordinate system for illustrating a relationship between an adjustment angle and a total torque in the example embodiment of FIGS. 5A and 5B. The abscissa of the coordinate systems is a value range of adjustment angle α. The ordinate of the coordinate system corresponds to total torque M acting on the adjusting component.

Total torque M is obtained from additively superimposing the individual torques of the various electrode combs. Total torque M thus comprises the torques of the AVC electrode combs (dashed line) and of the OOP electrode combs (dotted lines) known from FIGS. 2 and 4.

With an adjustment angle α within angle range 70, total torque M may be kept constant through a combined triggering of the AVC electrode combs and the OOP electrode combs. It is thus possible to adjust the mirror plate reliably over quasi-static operation by joint triggering of the various electrode combs in angle range 70, in which the individual torques of the OOP electrode combs and the AVC electrode combs are not constant.

At an adjustment angle α below angle range 70, the torque of the AVC electrode combs increases with an increase in adjustment angle α. Total torque M may be generated from the individual torques of the OOP electrode combs at adjustment angle α below angle range 70. However, at larger adjustment angles α above angle range 70, the effect of the AVC electrode combs is constant, whereas the effect of the OOP electrode combs is negligible. Total torque M may be generated from the individual torques of the AVC electrode combs at an adjustment angle α above angle range 70.

It is therefore advantageous to adjust the mirror plate by a small adjustment angle α below angle range 70 by triggering only the OOP electrode combs. Correspondingly, the mirror plate is adjusted by an adjustment angle α above angle range 70 by triggering only the AVC electrode combs. A constant total torque may thus be achieved over a larger adjustment angle range than by using only one type of electrode comb, i.e., exclusively OOP electrode combs or exclusively AVC electrode combs.

The example embodiment of the micromechanical component described above thus allows a reliable adjustment of a desired adjustment angle α via a joint triggering of the OOP electrode combs and the AVC electrode combs or via a specific triggering of the OOP electrode combs or the AVC electrode combs. In this way, an optimal curve of total torque M is thus achievable for small adjustment angles α as well as for large adjustment angles α.

Figure 7A:
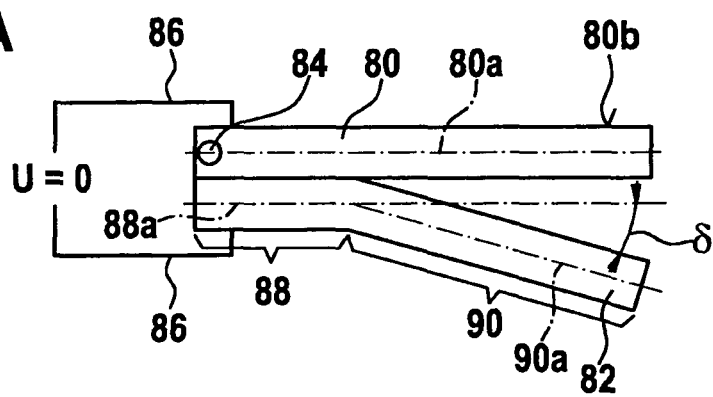
FIGS. 7A and 7B show a schematic diagram of one example embodiment of the electrode code.
Figure 7B:
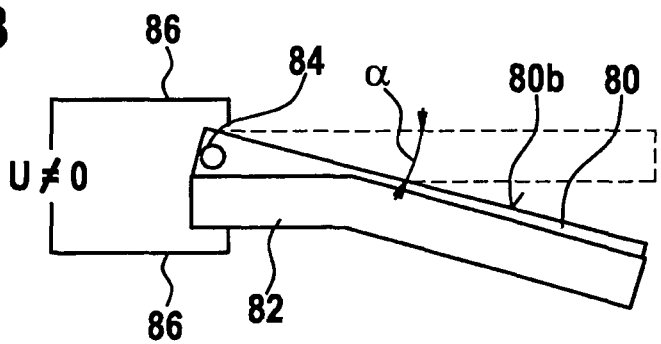

FIGS. 7A and 7B show a schematic diagram of an example embodiment of an electrode comb.

An actuator electrode comb 80 having a top side 80b and a stator electrode comb 82 are shown. While stator electrode comb 82 is fixedly secured in a micromechanical component (not shown), actuator electrode comb 80 may be rotated about an axis of rotation 84 in the direction of stator electrode comb 82 by applying a voltage via contact elements 86.

The electrode fingers of actuator electrode comb 80 point in one direction. Thus a central longitudinal axis 80a is definable for the electrode fingers of actuator electrode comb 80. However, the electrode fingers of stator electrode comb 82 have a bend. Two subunits 88 and 90 having different central longitudinal axes 88a and 90a are thus definable for each electrode finger of stator electrode comb 82. Central longitudinal axes 88a and 90a are inclined toward one another by a bend angle δ.

The electrode comb pair formed by the two electrode combs 80 and 82 may be referred to as a combination of OOP electrode combs and AVC electrode combs. Operation of the two electrode combs 80 and 82 offers the advantages of the combination of OOP electrode combs and AVC electrode combs.

In FIG. 7A, no voltage U is applied between actuator electrode comb 80 and stator electrode comb 82, and actuator electrode comb 80 is in its starting position.

FIG. 7B shows the two electrode combs 80 and 82 after a voltage not equal to zero is applied. Actuator electrode comb 80 is adjusted out of its starting position by an adjustment angle α in the direction of stator electrode comb 82 by resulting torque M. Due to the shape of the electrode fingers of stator electrode comb 82 having a suitably selected bend angle δ, a great increase in the overlap areas and thus an advantageous torque M are achieved in the adjustment of the two electrode combs 80 and 82 relative to one another for a desired range of adjustment angle α. In the case of a suitably selected bend angle δ in particular, a constant torque M may be ensured for a middle angle range of adjustment angle α.

The shape of the stator electrode comb 82 described above may thus also be applied to actuator electrode comb 80. Another advantage of a stator electrode comb 82 designed in this way and/or a corresponding actuator electrode comb 80 is thus that electrode combs 80 and 82 require much less space along an axis of rotation of an actuator. This in turn offsets the greater complexity in the manufacture of electrode combs 80 and 82.

What is claimed is:

1. A micromechanical component, comprising:
a first stator electrode comb and a first actuator electrode comb, wherein the first actuator electrode comb is situated in a first starting position at a first angle to the first stator electrode comb, and wherein the first actuator electrode comb is configured to be adjusted from the first starting position by application of a voltage between the first stator electrode comb and the first actuator electrode comb, a first actuator central longitudinal axis being defined for the first actuator electrode comb in the first starting position, and a first stator central longitudinal axis being defined for the first stator electrode comb, and wherein the first actuator central longitudinal axis is parallel to the first stator central longitudinal axis and has a first distance from the first stator central longitudinal axis; and a second stator electrode comb and a second actuator electrode comb, wherein the second actuator electrode comb is situated in a second starting position at a second angle in relation to the second stator electrode comb, the second angle being different from the first angle, and wherein the second actuator electrode comb is configured to be adjusted from the second starting position by application of a voltage between the second stator electrode comb and the second actuator electrode comb, a second actuator central longitudinal axis being defined for the second actuator electrode comb in the second starting position, and a second stator central longitudinal axis being defined for the second stator electrode comb, and wherein the second actuator central longitudinal axis is parallel to the second stator central longitudinal axis and has a second distance from the second stator central longitudinal axis different from the first distance.

2. The micromechanical component as recited in claim 1, further comprising:

an actuator configured to be adjustable by adjusting at least one of (i) the first actuator electrode comb with respect to the first stator electrode comb and (ii) the second actuator electrode comb with respect to the second stator electrode comb.

3. The micromechanical component as recited in claim 2, wherein the actuator is one of a micro-mirror plate or a micro-pincette.

4. The micromechanical component as recited in claim 2, wherein the actuator is configured to be adjustable.

5. The micromechanical component as recited in claim 2, wherein the first actuator electrode comb is situated in the first starting position with a parallel offset from the first stator electrode comb.

6. A micromechanical component, comprising:

a first stator electrode comb and a first actuator electrode comb, wherein the first actuator electrode comb is configured to be adjusted from a first starting position by application of a voltage between the first stator electrode comb and the first actuator electrode comb, a first actuator central longitudinal axis being defined for the first actuator electrode comb in the first starting position, and a first stator central longitudinal axis being defined for the first stator electrode comb, and wherein the first actuator central longitudinal axis is parallel to the first stator central longitudinal axis and has a first distance from the first stator central longitudinal axis; and a second stator electrode comb and a second actuator electrode comb, wherein the second actuator electrode comb is configured to be adjusted from a second starting position by application of a voltage between the second stator electrode comb and the second actuator electrode comb, a second actuator central longitudinal axis being defined for the second actuator electrode comb in the second starting position, and a second stator central longitudinal axis being defined for the second stator electrode comb, and wherein the second actuator central longitudinal axis is parallel to the second stator central longitudinal axis and has a second distance from the second stator central longitudinal axis different from the first distance.

7. A method of manufacturing a micromechanical component, comprising:

providing a first stator electrode comb and a first actuator electrode comb;

positioning the first actuator electrode comb in a first starting position at a first angle to the first stator electrode comb, wherein the first actuator electrode comb is configured to be adjusted from a first starting position by application of a voltage between the first stator electrode comb and the first actuator electrode comb, a first actuator central longitudinal axis being defined for the first actuator electrode comb in the first starting position, and a first stator central longitudinal axis being defined for the first stator electrode comb, and wherein the first actuator central longitudinal axis is parallel to the first stator central longitudinal axis and has a first distance from the first stator central longitudinal axis;

providing a second stator electrode comb and a second actuator electrode comb; and positioning the second actuator electrode comb in a second starting position at a second angle in relation to the second stator electrode comb, the second angle being different from the first angle, wherein the second actuator electrode comb is configured to be adjusted from a second starting position by application of a voltage between the second stator electrode comb and the second actuator electrode comb, a second actuator central longitudinal axis being defined for the second actuator electrode comb in the second starting position, and a second stator central longitudinal axis being defined for the second stator electrode comb, and wherein the second actuator central longitudinal axis is parallel to the second stator central longitudinal axis and has a second distance from the second stator central longitudinal axis different from the first distance.

8. A method of manufacturing a micromechanical component, comprising:

providing a first stator electrode comb and a first actuator electrode comb;

positioning the first actuator electrode comb in a first starting position, a first actuator central longitudinal axis being defined for the first actuator electrode comb in the first starting position, and positioning the first stator electrode comb relative to the first actuator electrode comb, a first stator central longitudinal axis being defined for the first stator electrode comb, wherein the first actuator central longitudinal axis is parallel to the first stator central longitudinal axis and has a first distance from the first stator central longitudinal axis, and wherein the first actuator electrode comb is configured to be adjusted from the first starting position by application of a voltage between the first stator electrode comb and the first actuator electrode comb;

providing a second stator electrode comb and a second actuator electrode comb; and positioning the second actuator electrode comb in a second starting position, a second actuator central longitudinal axis being defined for the second actuator electrode comb in the second starting position, and positioning the second stator electrode comb relative to the second actuator electrode comb, a second stator central longitudinal axis being defined for the second stator electrode comb, wherein the second actuator central longitudinal axis is parallel to the second stator central longitudinal axis and has a second distance from the second stator central longitudinal axis different from the first distance, and wherein the second actuator electrode comb is configured to be adjusted from the second starting position by application of a voltage between the second stator electrode comb and the second actuator electrode comb.

* * * * *

UNITED STATES PATENT AND TRADEMARK OFFICE
CERTIFICATE OF CORRECTION

PATENT NO.       : 8,581,470 B2
APPLICATION NO. : 12/736461
DATED            : November 12, 2013
INVENTOR(S)      : Pirk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 376 days.

Signed and Sealed this
Twenty-second Day of September, 2015

Michelle K. Lee
*Director of the United States Patent and Trademark Office*